Jan. 4, 1938.                  L. STATHAM ET AL                    2,104,440
                 METHOD OF GEOPHYSICAL PROSPECTING BY THE
                 COMPARISON OF STEADY STATE POTENTIALS
                         Filed June 6, 1936              5 Sheets-Sheet 3

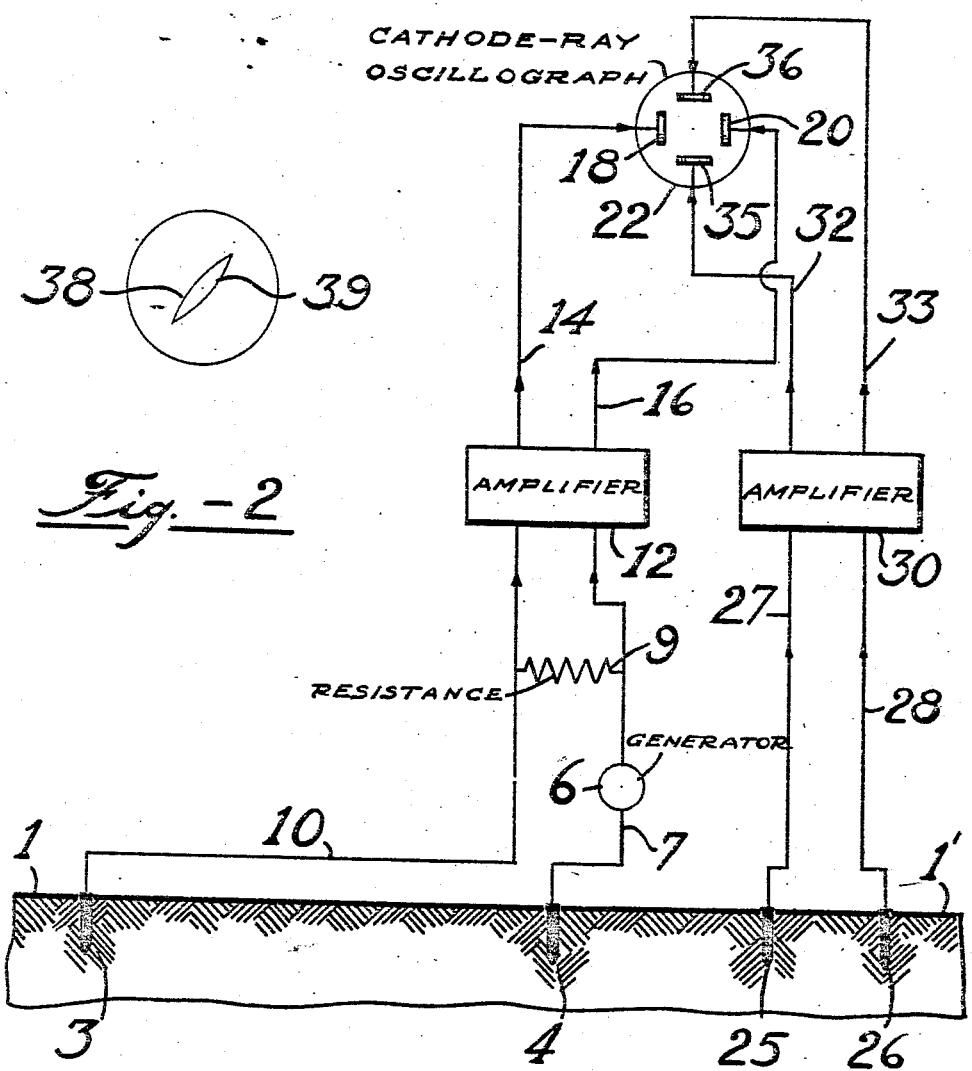

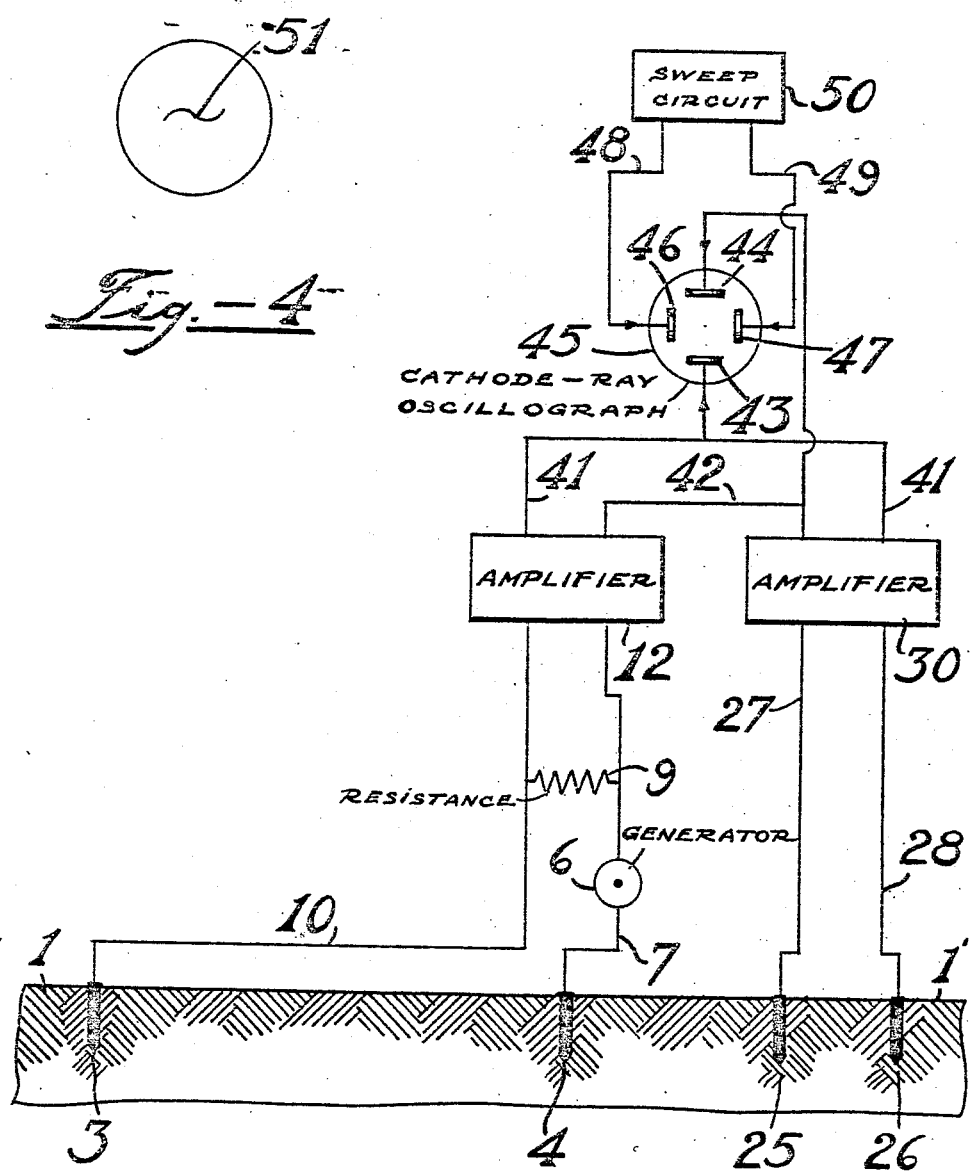

Ludwig W. Blau  Inventors
Louis Statham
By W. F. Weigester  Attorney

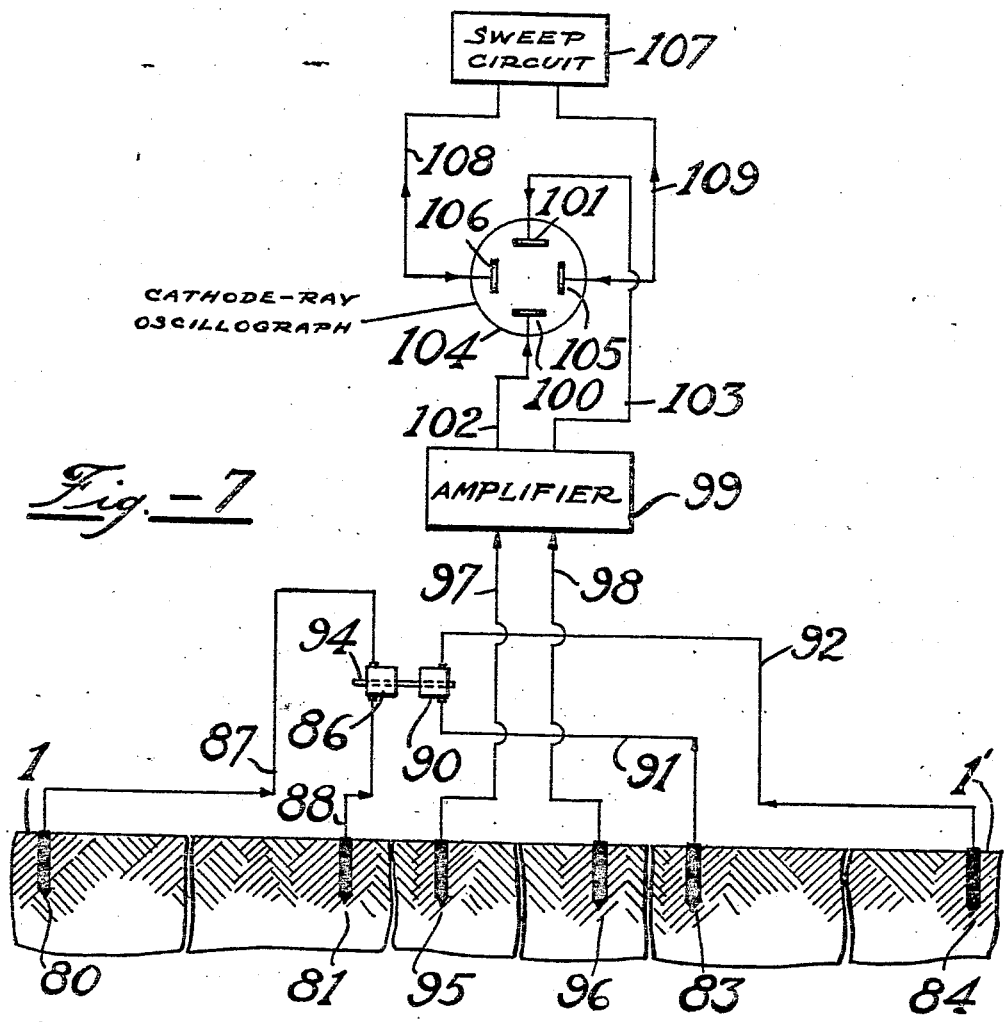
Jan. 4, 1938. L. STATHAM ET AL 2,104,440
METHOD OF GEOPHYSICAL PROSPECTING BY THE
COMPARISON OF STEADY STATE POTENTIALS
Filed June 6, 1936 5 Sheets-Sheet 4
Ludwig W. Blau Inventors
Louis Statham
By W.F. Weiqester Attorney

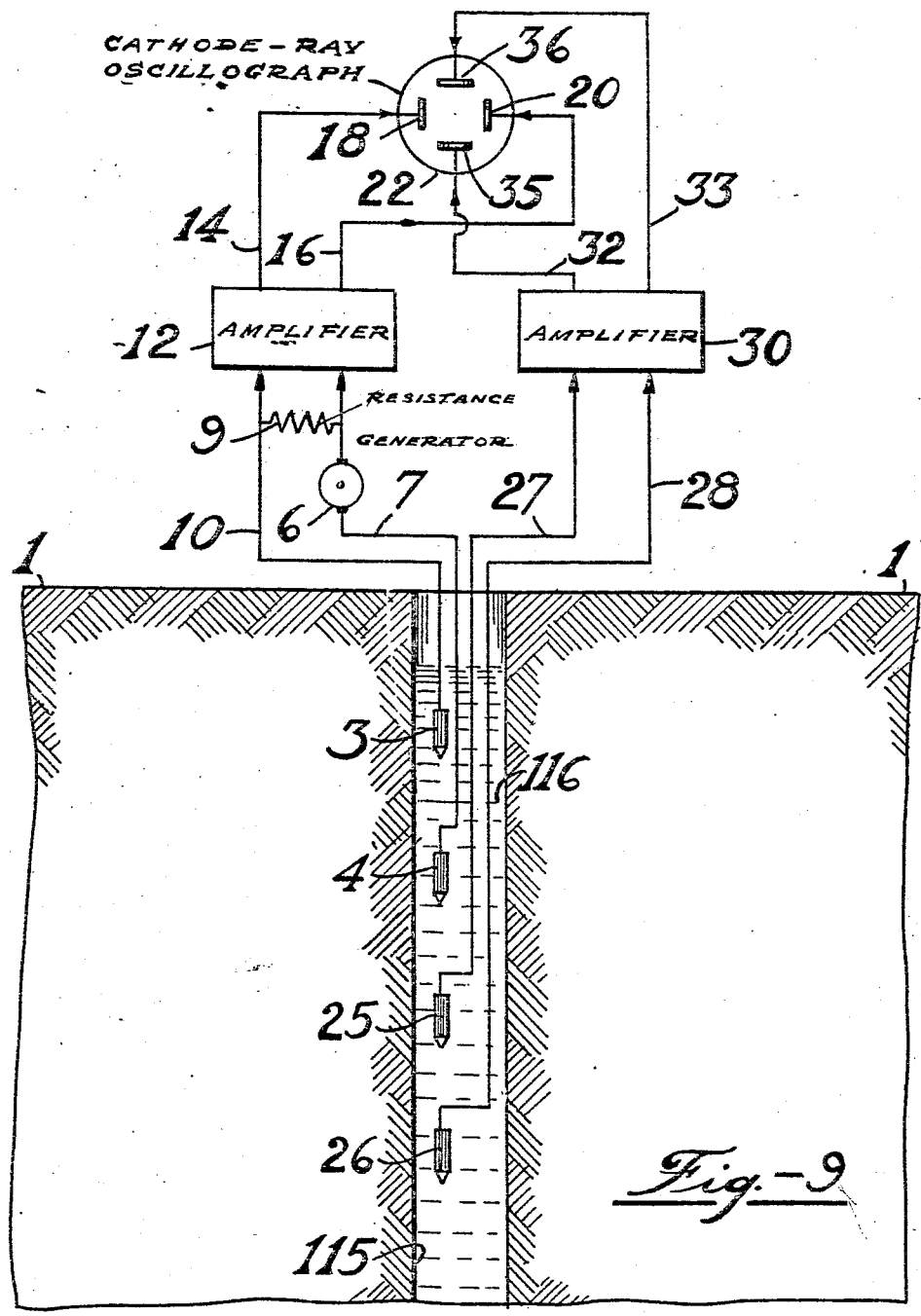

Patented Jan. 4, 1938

2,104,440

UNITED STATES PATENT OFFICE 2,104,440

METHOD OF GEOPHYSICAL PROSPECTING BY THE COMPARISON OF STEADY STATE POTENTIALS

Louis Statham and Ludwig W. Blau, Houston, Tex., assignors to Standard Oil Development Company, a corporation of Delaware Application June 6, 1936, Serial No. 83,902

5 Claims. (Cl. 175—182)

This invention relates to an improved method for determining variations in the electrical properties of the earth. More particularly it relates to the determination of the variations in phase of electrical potentials transmitted through the earth.

The invention will be fully understood from the following description taken in connection with the accompanying drawings in which latter, Fig. 1 is a diagrammatic representation of a preferred form of apparatus for carrying out the invention showing in vertical sectional view the electrodes in position in the earth.

Fig. 2 is a record obtained utilizing the apparatus illustrated in Fig. 1.

Fig. 3 is a diagrammatic representation of a modified form of apparatus for carrying out the invention.

Fig. 4 is a record obtained utilizing the apparatus illustrated in Fig. 3.

Fig. 5 is a diagrammatic representation of still another modified form of the invention.

Fig. 6 is a record obtained utilizing the apparatus illustrated in Fig. 5.

Fig. 7 is a diagrammatic representation of a preferred form of apparatus for comparing directly the variations in phase relations of different areas.

Fig. 8 is a record obtained using the apparatus illustrated in Fig. 7, and,

Fig. 9 is a vertical section view through the earth showing the apparatus used in a well.

Referring particularly to Figs. 1 and 2 of the drawings reference numerals 1—1' represent the surface of the earth. Primary electrodes 3 and 4 are disposed in the earth in spaced relation to each other. Means are provided for passing alternating current through the earth between the electrodes 3 and 4. The means comprises a generator 6 which is connected through a lead 7 with the electrode 4 and is connected through a known resistance 9 and lead 10 with the electrode 3. An electromotive force across the resistance 9 is amplified by means of the amplifier 12. The amplified current is passed through leads 14 and 16 to the horizontal deflecting plates 18 and 20 of the cathode-ray oscillograph 22. Secondary electrodes 25 and 26 are disposed in the earth in spaced relation to each other and to the primary electrodes 3 and 4. The passage of the alternating current between electrodes 3 and 4 gives rise to an alternating potential difference between the secondary electrodes 25 and 26. The electromotive force is conducted from electrodes 25 and 26 through leads 27 and 28, respectively, to an amplifier 30. The amplified current passes from amplifier 30 through leads 32 and 33 to the vertical deflecting plates 35 and 36, respectively, of the cathode-ray oscillograph 22.

A record obtained by utilizing the apparatus above described is illustrated in Fig. 2 in which the space between the lines designated by reference numerals 38 and 39 is a measure of the phase difference between the primary current and the secondary electromotive force. As the phase difference between the primary current and the secondary electromotive force diminishes, the distance between lines 38 and 39 diminishes and becomes zero when the phases are equal. As the phase difference between the primary current and the secondary electromotive force increases the spacing between the lines 38 and 39 increases until the record appears as a circle when the phases are exactly opposite.

In one manner of carrying out the invention the electrodes 3 and 4 are spaced from each other a distance of approximately 2,000 feet. The electrodes 25 and 26 are spaced from each other a distance of approximately 1,000 feet. The electrodes 4 and 25 are spaced from each other a distance of approximately 1,000 feet. As the distance from the primary electrodes to the secondary electrodes increases, the phase difference between the primary current and the secondary electromotive force increases. The depth of penetration of the current lines which give rise to the electromotive force at the secondary electrodes 25 and 26 depends upon the distance between electrodes 4 and 25, so that it is desirable that the distance between the electrodes 4 and 25 be as great as field conditions will permit. The phase difference between the primary current and the secondary electromotive force increases with the distance between electrodes 4 and 25. Although the primary and secondary electrodes are shown in Fig. 1 as being in substantial alignment with each other and with the secondary electrodes disposed exteriorly of the primary electrodes, it will be understood that the relative positions of the primary and secondary electrodes can be varied as desired and some of the advantages of the invention will be retained. If desired, the secondary electrodes 25 and 26 may be placed between the primary electrodes 3 and 4.

In the preferred form of the invention the cathode-ray oscillograph 22 which is used is of the four-plate electrostatic deflection type which can be used to impress upon the fluorescent screen any phenomena which it may be desired to study by visual observation without the necessity of employing photography.

By the construction described the amplified electromotive forces obtained from the primary and secondary circuits are both applied to a common indicator whereby the phase relation of the electromotive forces is indicated.

Referring particularly to Figs. 3 and 4 of the drawings, a like arrangement of electrodes and circuits connecting electrodes with the amplifiers 12 and 30 is illustrated identical in all respects with the structure illustrated in Fig. 1 and like reference numerals have been applied to like parts. The electromotive forces after amplification are connected in parallel in opposite phase by means of leads 41 and 42 to the vertical deflection plates 43 and 44 respectively of the cathode-ray oscillograph 45, the horizontal deflection plates 46 and 47 of which are connected by leads 48 and 49 to the sweep circuit 50. Referring to Fig. 4, reference numeral 51 represents a record taken in the manner shown in Fig. 3 and is a record of the phase relation between primary current and secondary electromotive force. If the phase difference between the primary current and the secondary electromotive force is zero, the line 51 will be straight; the amount of curvature of the line 51 denotes the phase difference between the primary current and the secondary electromotive force. The sweep circuit 50 serves to give the necessary horizontal displacement of the electron beam to form the line 51.

By the construction described, the amplified electromotive forces are applied in opposite phase to a common indicator in order that the difference may be observed directly.

Referring particularly to Figs. 5 and 6, a modified form of the invention is illustrated in which the arrangement of primary electrodes 3 and 4 and secondary electrodes 25 and 26 and their connections with the amplifiers 12 and 30, respectively, is identical with that illustrated in Figs. 1 and 3 and like reference numerals have been applied to like parts. The amplified electromotive force from the primary electrodes 3 and 4 is conducted through leads 60 and 61 to a galvanometer 63. The amplified electromotive force from secondary electrodes 25 and 26 is conducted through leads 65 and 66 to a galvanometer 67. The deflections of the galvanometers 63 and 67 are recorded simultaneously by means of the light source 68 and the moving film 69. The film 69 contains suitable time lines 71 which are produced by means well known to the art and illustrated in the record shown in Fig. 6. 72 represents the trace produced by the galvanometer 63 in Fig. 5, and 73 represents the trace produced by the galvanometer 67 in Fig. 5, showing the oscillations of the primary current and the secondary electromotive force, respectively. If the primary currents and secondary electromotive forces are in equal phase the line 73 will be superimposed on the line 72. When the phases are different, the difference in phase is given by the displacement of the line 73 from the line 72. This can be measured by measuring the distance between comparable parts of the lines 72 and 73 as indicated at A and B.

By the structure described the electromotive forces in the circuits of the primary and secondary electrodes are recorded simultaneously on a common record whereby the phase relation is indicated.

Referring particularly to Figs. 7 and 8 of the drawings a modified form of the apparatus is illustrated in which reference numerals 80 and 81 designate a set of primary electrodes in the earth. Reference numerals 83 and 84 designate another set of primary electrodes in the earth. Means are provided for passing alternating current through the earth between the electrodes of each set in equal phase by means comprising a generator 86 which is connected through leads 87 and 88 with the electrodes 80 and 81. A generator 90 is connected with the electrodes 83 and 84 by leads 91 and 92. The generators 86 and 90 are mounted upon a common shaft 94; thus they generate currents of equal phase in the two primary circuits. The two primary currents give rise to an electromotive force at the secondary electrodes 95 and 96 which are connected by leads 97 and 98 to the amplifier 99. The amplified electromotive force is connected through leads 102 and 103 to the vertical deflection plates 100 and 101 of the cathode-ray oscillograph 104. The horizontal deflection plates 105 and 106 are connected to a suitable sweep circuit 107 through leads 108 and 109. Fig. 8 shows a record taken in the manner shown in Fig. 7 in which the amplitude of oscillation of the line 110 is a measure of the amount of electromotive force received at the secondary electrodes. The currents in the primary circuits are made to flow in opposite direction, so that each primary circuit contributes to the secondary circuit a component of electromotive force. If the two components bear the same relationship to the respective primary currents, then the resultant electromotive force in the secondary circuit is zero. Fig. 8 shows a record taken where the two components of electromotive force were unequal in phase. Since the phases of the two components depend upon the spacings between electrodes 81 and 95, and 83 and 96, respectively, the two components can be made equal in phase by moving either electrode 95 or 96 laterally, thereby producing zero electromotive force in the secondary circuit. Thus we are able to measure the deviation in homogeneity of the earth from place to place by measuring the distance through which one of the electrodes of the secondary system must be moved in order that the total electromotive force be zero, or that the line 110 be straight.

Essentially the different modifications described serve for the comparison of the building up of the potential between certain potential electrodes located at a definite distance from the nearest current electrode at different locations over the area to be investigated. Thus it is found that the phase difference as indicated at A—B in Fig. 6 varies greatly from one location to the next and is indicative of the behavior of the electric currents as determined by the electrical constants of the ground. Thus at such locations as have a high electrical conductivity the potential builds up slightly later at the potential electrodes than at other points of low electrical conductivity, and the phase difference A—B is far greater at the location where the conductivity is high. The modification shown in Fig. 7 permits of finding points on the earth's surface where the potential electrodes 95 and 96 may be located so that the potentials from the electrodes 95 and 96 due to the current electrodes 80, 81, 82 and 84 may be accurately in phase. The distances from the electrode 83 to 96 and from the electrodes 95 to 81 serve as an indication of the differences in electrical behavior of the ground in the current circuits 80 to 81, and 83 to 84, respectively.

Referring to Fig. 9, there is illustrated the apparatus of Fig. 1 used in logging a well 115 and like reference numerals have been applied to like parts as in Fig. 1. The electrodes 3, 4, 25 and 26 are suspended in water, mud or the like 116 in the hole. It will be understood that the apparatus illustrated in Figs. 3, 5 and 7 could be used for logging the well.

While the invention has been described as applied to the surface of the ground, it will be understood that it can be carried out in water, under water, along the sides of cliffs or other vertical structures, in bore holes, or in mines. Also, it can be applied to the determination of the electrical properties of other materials such as metals, semi-conductors and insulators. The invention can be used in geophysical prospecting for oil, minerals or the like.

Various changes and alternate arrangements may be made within the scope of the appended claims, in which it is our intention to claim all novelty inherent in the art as broadly as the prior art permits.

We claim:

1. The method of determining variations in electrical properties of the earth, which comprises passing an alternating current through two or more sets of primary electrodes in the ground whereby an electromotive force is caused to exist between two secondary electrodes in the ground, and comparing the various phase relations which exist between the current in each set of primary electrodes and its induced electromotive force at the secondary electrodes.

2. Apparatus for determining variations in electrical properties of the earth, which comprises a plurality of sets of spaced primary electrodes in the earth, spaced secondary electrodes in the earth at a distance from the sets of primary electrodes, means for passing alternating currents of equal phase through the earth between the sets of primary electrodes giving rise to an electromotive force between the secondary electrodes, and means for recording the electromotive force at the secondary electrodes.

3. The method of determining variations in electrical properties of the earth which comprises generating currents of equal phase, passing the currents simultaneously through a plurality of sets of primary electrodes in the ground whereby an electromotive force is caused to exist between two secondary electrodes in the ground, and comparing the various phase relations which exist between the current in each set of primary electrodes and its induced electromotive force at the secondary electrodes.

4. The method of determining variations in electrical properties of the earth which comprises generating currents of equal phase, passing the currents simultaneously through two or more sets of primary electrodes in the ground in opposite directions whereby an electromotive force is caused to exist between two secondary electrodes in the ground, and comparing the various phase relations which exist between the current in each set of primary electrodes and its induced electromotive force at the secondary electrodes.

5. Apparatus for determining variations in electrical properties of the earth which comprises a plurality of sets of spaced primary electrodes in the earth, spaced secondary electrodes in the earth at a distance from the sets of primary electrodes, means for passing alternating currents of equal phase through the earth between the sets of primary electrodes giving rise to an electromotive force between the secondary electrodes, the means including a generator for each set of primary electrodes, and means for recording the electromotive force in the secondary electrodes.

LOUIS STATHAM.
LUDWIG W. BLAU.